H. R. EDGECOMB.
APPARATUS FOR MANUFACTURING INSULATING SHEETS.
APPLICATION FILED AUG. 10, 1910.

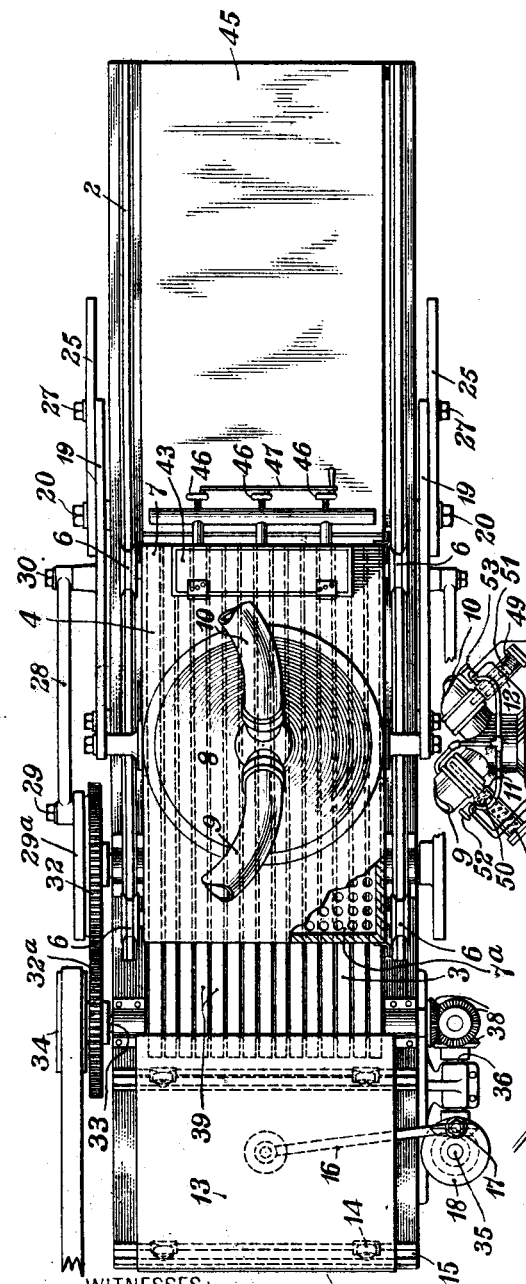

1,201,028.

Patented Oct. 10, 1916.
2 SHEETS—SHEET 2.

WITNESSES:
C. L. Belcher
R. J. Barbour

INVENTOR
Henry R. Edgecomb
BY
Wesley G. Carr
ATTORNEY

UNITED STATES PATENT OFFICE.

HENRY R. EDGECOMB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

APPARATUS FOR MANUFACTURING INSULATING-SHEETS.

1,201,028.  Specification of Letters Patent.  Patented Oct. 10, 1916.

Application filed August 10, 1910.  Serial No. 576,569.

*To all whom it may concern:*

Be it known that I, HENRY R. EDGECOMB, a citizen of the United States, and a resident of Edgewood Park, in the county of Allegheny and State of Pennsylvania, have invented a new and useful Improvement in Apparatus for Manufacturing Insulating-Sheets, of which the following is a specification.

My invention relates to the manufacture of sheet insulating material and particularly to means for automatically producing insulating sheets composed of layers of paper or other suitable fabric, mica flakes and bonding material.

The object of my invention is to provide a simple mechanism for automatically and continuously producing sheet insulation that shall be uniform in thickness and compare favorably with similar products heretofore produced by slow and tedious manual operations.

By reason of its excellent insulating properties and its ability to withstand high temperatures, sheet mica has been very largely utilized as the principal ingredient of insulation used in the manufacture of transformers, dynamo-electric machines, and other electric apparatus. In order to secure uniform results, the mica has heretofore been split into flakes of uniform thickness which were placed one by one, with their edges overlapping, upon a sheet of shellac-coated paper, or other suitable fabric. The amount of labor involved obviously renders the product, produced as above indicated, very expensive, and it has been my aim to secure a satisfactory product by means of a more or less automatic machine which is capable of turning out the work at relatively high speed and requires a minimum amount of time and attention on the part of the operator.

The machine of my present invention comprises, in general, a chamber which is provided with pipes for alternately exhausting the air from the chamber and admitting air thereto. One wall of the chamber has a plane outer surface and is perforated so that when the air is exhausted from the chamber, external objects may be held against the surface by atmospheric pressure. Means are also provided for carrying mica flakes close to the perforated wall of the chamber so that a thin layer of them may be drawn and held against the surface until the chamber is moved bodily to a position over a receiving table where they may be deposited by introducing air to the chamber.

Figure 3:
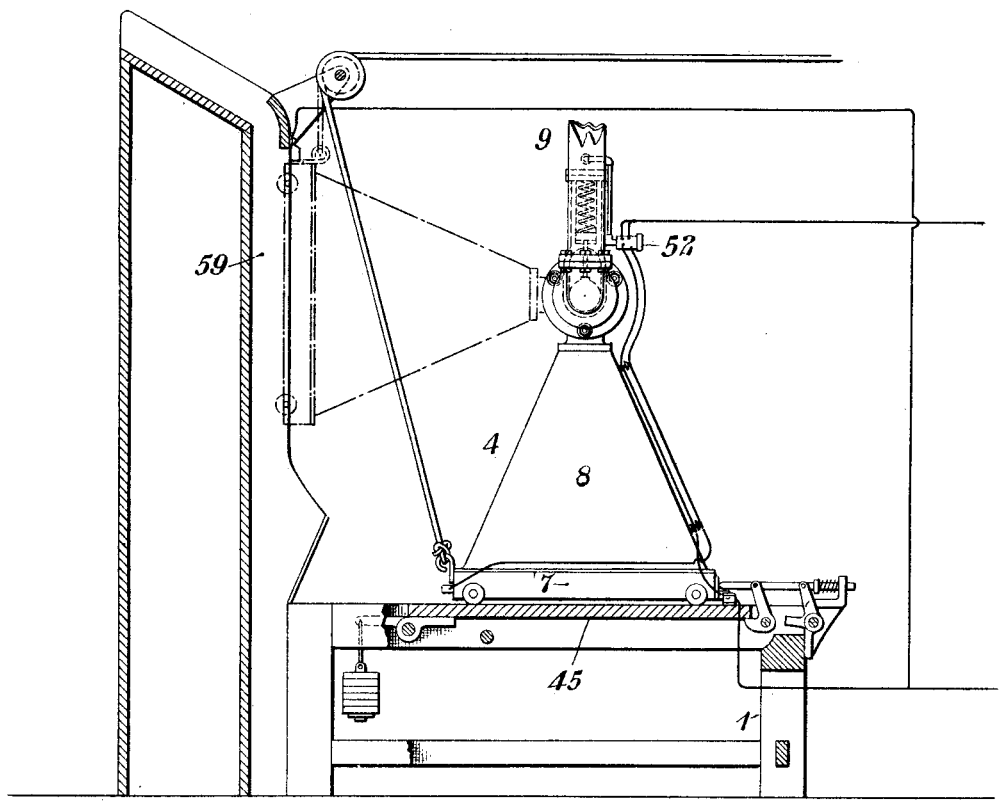
Figure 4:
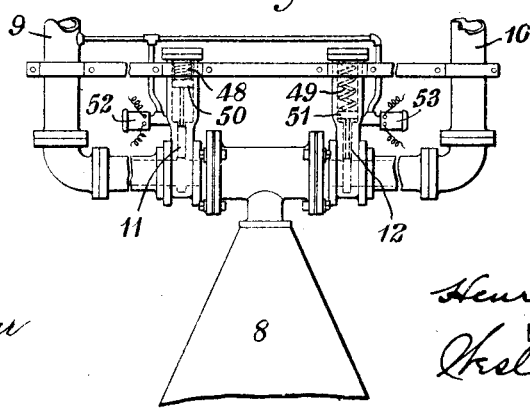

Figure 1, of the accompanying drawings, is a plan view, and Fig. 2 is an elevation of a machine constructed in accordance with my invention. Fig. 3 is a partially sectional elevation of a modified form of apparatus for accomplishing the same result. Fig. 4 is an elevation at right angles to that of Fig. 3, showing a portion of the valve mechanism by which the air pressure in the chamber is regulated.

Referring to Figs. 1 and 2 of the drawings, the structure here shown comprises a frame 1, having rails or guide ways 2 on its top surface, a transfer belt or apron 3, a conveyer 4, and an inclined feed mechanism 5 from which the mica flakes are adapted to be discharged upon the transfer belt or apron 3.

The conveyer 4 is mounted upon wheels or trucks 6 having grooved surfaces which engage the rails 2. The conveyer 4 comprises a rectangular box 7 having a plane perforated bottom 7ª and a dome 8 terminating in a pair of flexible pipes 9 and 10, severally provided with valves 11 and 12 by means of which the air pressure within the conveyer is governed, the pipe 10 being connected to a suitable vacuum device (not shown).

The feed mechanism 5 comprises a table 13 which lies in an oblique plane and is mounted upon rollers 14 which run in transverse guide ways 15 on the frame 1. The table 13 is vibrated laterally by means of a pitman rod 16 which is secured to the under side of the table, near its middle point, and is connected, at its outer end, to an eccentric projection or crank pin 17 on a rotating disk 18. The conveyer 4 is moved backward and forward on the track 2, a short period of rest being provided at each end of its movement path. The movement of the conveyer 4 is effected by means of two sets of links and levers located at the respective sides of the frame 1, each of which comprises a lever 19 pivoted at 20 on the frame 1 and having a long slot 22 to receive a pin 21 on the side of the box 7, a lever 23 pivotally secured to the frame 1 at 24, a link 25 connected to the outer end of the lever 23 and joined to the corresponding end of the lever 19 by means of a slot 26 and a pin 27, and a driving rod 28 which is connected, at one end, to a crank pin 29 on a gear wheel 32 and, at the other end, to a pin 30 with which the lever 23 is provided adjacent to one end. The gear wheel 32 is mounted on the shaft 31 and is driven by a gear wheel 32ª on a shaft 33.

The shaft 33 is continuously driven by any suitable means, it being provided with a driving pulley 34, as shown in the drawing. The disk 18 is secured to the upper end of a shaft 35 which is operatively connected to the shaft 33 by means of jack shafts 36 and 37 and bevel gears 38.

The transfer apron 3 consists of a set of belts or straps 39 which are relatively narrow and are slightly spaced apart, in order to permit the air to pass freely between them without allowing mica flakes to fall through. The belts or straps are passed over a set of pulleys 40, which are mounted on the shaft 33, and a second set of pulleys 41 which are mounted on an idler shaft 42.

One end of the box 7 is preferably provided with a tank 43 containing liquid shellac, or other suitable bonding material, and having a plurality of vertical perforated discharge pipes 44 which are adapted to evenly spread liquid shellac, or other liquid bond, over the surface of a sheet of paper, or other fabric, which is laid on a receiving table 45, at one end of the frame 1. The rate of flow from the tank 43 may be regulated by a set of stop cocks 46 which are coupled together by means of a rod 47, in order to insure synchronous operation.

The valves 11 and 12 are provided, respectively, with springs 48 and 49 which act upon pistons 50 and 51 and tend to close the valves in opposition to fluid pressure which is regulated through the pipes 9 and 10 under the control of valve magnets 52 and 53.

The operation of the apparatus is as follows: Assuming that a sheet of thin paper is spread upon the table 45 and a quantity of mica flakes placed upon the table 13, and the apparatus set in motion, the vibratory movement of the table 13 will cause the mica flakes to gradually move down the incline to the transfer apron 3. The speed of the transfer belt and the vibratory movement of the table are so proportioned that the flakes are uniformly distributed over the apron. Under the aforesaid conditions, movement of the conveyer 4 over the transfer apron 3 until a stationary contact member 54 is engaged by a contact member 55 on the box 7, completes a circuit from any suitable source of energy, such as battery 56, to the valve magnet 53, which, when energized, opens the valve 12 and thus permits a partial vacuum to be produced in the conveyer 4. The external air pressure serves to instantly lift the mica flakes from the apron and hold them in engagement with the perforated bottom surface of the box 7. In the normal operation of the device, the conveyer 4 then moves forwardly away from the table 13, the valve 12 being held open until the mica flakes are transferred by the box to a position directly above the paper upon the table 45. At the end of the movement in this direction, contact members 57 and 58 come into engagement with each other and complete a circuit through the valve magnet 52. By this means, the valve 11 is opened and air of a pressure above atmospheric pressure is admitted to the conveyer to force the mica flakes downwardly upon the paper. The coating of shellac which is applied to the paper, as the conveyer is moved forward, serves to hold the deposited flakes in position. The lost motion connections between the links 25 and the levers 19 allow the chamber to be at rest at the ends of its path of movement for sufficient lengths of time to receive the mica flakes at one end and discharge them at the other. This process is repeated until a sufficient number of layers of mica flakes have been deposited to produce a sheet of insulation of the desired thickness, when the sheet is removed and a new sheet of paper is laid upon the table 45.

It is evident that it is only necessary to an attendant to supply mica flakes for the table 13 in sufficient quantities to make the process continuous and to remove the sheets of insulation from the table 45 at the proper intervals.

It will, of course, be understood that a manually operated controller could readily be substituted, to perform the functions of the contact members 54, 55, 57 and 58, or suitable means might be provided for manually governing the valves 11 and 12. The vibratory table 13 may be replaced by some other means for properly distributing the mica flakes upon the traveling apron.

Reference may now be had to Figs. 3 and 4 of the drawings, in which the conveyer has a movement of partial revolution instead of a horizontal back and forth movement. Corresponding parts in these figures will be designated by the same characters as those used in Figs. 1 and 2. According to the modification here shown, the mica flakes are dropped downwardly through a narrow vertical passageway 59, the perforated surface of the box 7 being in a vertical plane and forming one wall of this passage, when at one limit of its rotary adjustment, as shown in broken lines in Fig. 3. When in this position, the valve 12 is opened to partially exhaust the air from the conveyer whereby the mica flakes are forced against the perforated surface by atmospheric pressure. It may be found that it is necessary to produce a somewhat higher vacuum than is necessary with the arrangement of Fig. 1, in order to hold the mica flakes in place, as the conveyer moves from its vertical to its horizontal position, as shown in Fig. 3 of the drawings. When the horizontal position is reached, the conveyer is directly over a table, or base, corresponding to the table 45 of Fig. 1, where the mica flakes are deposited. The operation of the apparatus is so nearly like that of Fig. 1 that it is considered unnecessary to present a detailed description thereof.

Structural modifications may be effected within the spirit and scope of my invention, and other materials than those specifically mentioned may be utilized, if desired.

I claim as my invention:

1. The combination with a flake-feeding mechanism comprising a vibratory feed table and a continuously operating transfer device, of a conveyer adapted to receive flake material from the said transfer device and means for varying the fluid pressure within the conveyer to load and discharge the flake material.

2. The combination with a conveyer having a perforated wall, and a continuously operating flake-feeding mechanism, comprising a vibratory feed table and a transfer device of means for varying the fluid pressure within the conveyer and means for intermittently moving the conveyer adjacent to and away from the transfer device.

3. The combination with a hollow conveyer having a perforated lower wall, of a feeding table adapted to be continuously vibrated, a perforated endless belt transfer device adapted to receive material from the said table, valves for controlling the fluid pressure within the hollow conveyer, electrical means for actuating said valves and a linkage mechanism for intermittently moving the hollow conveyer adjacent to and away from the endless belt transfer device.

4. The combination with an inclined vibratory table and a perforated transfer device for flake material, of a hollow conveyer movable over and away from the transfer device and having a perforated wall adjacent to said device and means for so varying the fluid pressure within the conveyer that a layer of flake material may be received from the transfer device and conveyed away.

5. The combination with an inclined feed table and a perforated endless belt device to receive flake material therefrom, of means for vibrating the feed table, a hollow conveyer having a perforated wall adjacent to the endless belt device and means for moving the hollow conveyer over and away from the endless belt device and for varying the fluid pressure within it.

6. The combination with an inclined feed table and a perforated transfer device to receive mica flakes therefrom, of means for vibrating the feed table, a hollow conveyer having a perforated wall adjacent to the transfer device, a plurality of links for moving the conveyer over and away from the transfer device and means for successively decreasing and increasing the fluid pressure within it, whereby flake material may be received from the transfer device and discharged at a distant point.

7. The combination with an inclined feed table and a perforated transfer device to receive flake material therefrom, of means for vibrating the feed table, a hollow conveyer having a perforated wall adjacent to the transfer device, means for moving the conveyer over and away from the transfer device, and electrically operated means, controlled by the position of the conveyer, for varying the fluid pressure therein.

8. The combination with an inclined feed table and a transfer device to receive flake material therefrom, of means for vibrating the feed table, a hollow conveyer having a perforated wall adjacent to the transfer device and means for moving the conveyer over and away from the transfer device and successively producing a partial vacuum and increasing the pressure therein above atmospheric pressure, whereby the flake material is received from the transfer device and discharged at a distant point.

In testimony whereof, I have hereunto subscribed my name this 29th day of July, 1910.

HENRY R. EDGECOMB.

Witnesses:
R. J. DEARBORN,
B. B. HINES.